US012675508B2

(12) United States Patent
Li et al.

(10) Patent No.: US 12,675,508 B2
(45) Date of Patent: Jul. 7, 2026

(54) METHOD AND APPARATUS FOR DETERMINING SPATIAL TWO-TUPLE, COMPUTER DEVICE, AND STORAGE MEDIUM

(71) Applicant: JINGDONG CITY (BEIJING) DIGITS TECHNOLOGY CO., LTD., Beijing (CN)

(72) Inventors: Ruiyuan Li, Beijing (CN); Rubin Wang, Beijing (CN); Wei Wu, Beijing (CN); Jie Bao, Beijing (CN)

(73) Assignee: JINGDONG CITY (BEIJING) DIGITS TECHNOLOGY CO., LTD., Beijing (CN)

( * ) Notice: Subject to any disclaimer, the term of this patent is extended or adjusted under 35 U.S.C. 154(b) by 369 days.

(21) Appl. No.: 18/270,753

(22) PCT Filed: Jan. 25, 2022

(86) PCT No.: PCT/CN2022/073864
    § 371 (c)(1),
    (2) Date: Jul. 3, 2023

(87) PCT Pub. No.: WO2022/161368
    PCT Pub. Date: Aug. 4, 2022

(65) Prior Publication Data
    US 2024/0078255 A1      Mar. 7, 2024

(30) Foreign Application Priority Data
    Jan. 27, 2021   (CN) ......................... 202110113826.9

(51) Int. Cl.
    *G06F 16/29*        (2019.01)
    *G06F 16/22*        (2019.01)
    (Continued)

(52) U.S. Cl.
    CPC .......... *G06F 16/29* (2019.01); *G06F 16/2246* (2019.01); *G06T 17/005* (2013.01); *G06T 17/05* (2013.01)

(58) Field of Classification Search
    CPC .......... G06F 16/00; G06F 16/20; G06F 16/22; G06F 16/2246; G06F 16/29; G06F 16/38;
    (Continued)

(56) References Cited

U.S. PATENT DOCUMENTS

| | | | | |
|---|---|---|---|---|
| 2007/0135992 A1* | 6/2007 | Riise | ....................... | G06F 16/29 455/456.1 |
| 2008/0133484 A1* | 6/2008 | Yamamoto | .............. | G06F 16/29 707/E17.049 |

(Continued)

FOREIGN PATENT DOCUMENTS

| | | |
|---|---|---|
| CN | 101093501 A | 12/2007 |
| CN | 105574535 A | 5/2016 |

(Continued)

OTHER PUBLICATIONS

Patel, Jignesh M., and David J. DeWitt. "Partition based spatial-merge join." ACM Sigmod Record. vol. 25. No. 2. ACM, 1996 (Year : 1996).*

(Continued)

*Primary Examiner* — Yuwen Pan
*Assistant Examiner* — Samuel H. Leonard
(74) *Attorney, Agent, or Firm* — Bridgeway IP Law Group, PLLC; Jihun Kim

(57) ABSTRACT

A method for determining a spatial two-tuple is performed by a computer device. The method comprises: obtaining a given spatial distance and multiple spatial objects, wherein each spatial object belongs to a first spatial object set or belongs to a second spatial object set (101); determining a global area according to a minimum bounding rectangle (Continued)

(MBR) and an extended minimum bounding rectangle (EMBR) corresponding to the first spatial object set and an MBR and an EMBR corresponding to the second spatial object set (102); performing subspace division on the global area to obtain multiple subspaces (103); partitioning the multiple spatial objects according to a positional relationship between each spatial object and each subspace to determine spatial objects comprised in each subspace (104); and according to a spatial distance between the spatial objects of each subspace, determining a spatial two-tuple comprised in each subspace that matches the given spatial distance (105).

18 Claims, 9 Drawing Sheets

(51) Int. Cl.
    *G06T 17/00*          (2006.01)
    *G06T 17/05*          (2011.01)
(58) Field of Classification Search
    CPC ...... G06F 16/387; G06F 16/48; G06F 16/487;
        G06F 16/58; G06F 16/587; G06F 16/68;
        G06F 16/687; G06F 16/78; G06F 16/787;
        G06F 16/907; G06F 16/909; G06F
        2221/00; G06F 2221/2111; G06F 16/44;
        G06F 16/444; G06F 16/245; G06F
        16/2453; G06F 16/2455; G06F 16/24558;
        G06F 16/2456; G06F 3/00; G06F 3/06;
        G06F 3/0601; G06F 3/0628; G06F
        3/0638; G06F 3/0644; G06F 18/00; G06F
        18/21; G06F 18/2163; G06T 17/00; G06T
        17/005; G06T 17/05
    See application file for complete search history.

(56)                    References Cited

U.S. PATENT DOCUMENTS

| | | | | |
|---|---|---|---|---|
| 2013/0212107 A1* | 8/2013 | Uchida | ............... | G06F 16/2228 |
| | | | | 707/739 |
| 2014/0152664 A1* | 6/2014 | Le Meur | ................. | G06T 17/05 |
| | | | | 345/428 |
| 2014/0244635 A1* | 8/2014 | Hu | ...................... | G06F 16/9537 |
| | | | | 707/724 |
| 2016/0019248 A1* | 1/2016 | Hu | ...................... | G06F 16/2246 |
| | | | | 707/722 |
| 2016/0299910 A1* | 10/2016 | Mokbel | ................... | G06F 16/29 |
| 2017/0286855 A1* | 10/2017 | Hao | ........................ | G06F 16/29 |
| 2018/0137675 A1* | 5/2018 | Kwant | .................... | G06T 17/05 |
| 2019/0277974 A1* | 9/2019 | Sahr | ........................ | G06T 17/20 |
| 2020/0226150 A1* | 7/2020 | Shirani-Mehr | .... | G01C 21/3859 |
| 2020/0371993 A1* | 11/2020 | Briseno | ................. | G06F 16/134 |
| 2020/0401585 A1* | 12/2020 | Yuan | ................... | G06F 16/2456 |
| 2021/0190511 A1* | 6/2021 | Sergeev | ............ | G01C 21/3859 |
| 2021/0279949 A1* | 9/2021 | Cao | ......................... | G06T 17/00 |
| 2021/0342586 A1* | 11/2021 | Fleisig | ................ | G06V 10/457 |
| 2022/0204029 A1* | 6/2022 | Chen | ....................... | G01S 17/42 |
| 2022/0284025 A1* | 9/2022 | Adams | ................ | G06F 16/2272 |
| 2025/0265549 A1* | 8/2025 | Rogynskyy | .......... | H04L 67/535 |

FOREIGN PATENT DOCUMENTS

| | | |
|---|---|---|
| CN | 105654519 A | 6/2016 |
| CN | 106055563 A | 10/2016 |
| CN | 113761092 A | 12/2021 |
| CN | 113761093 A | 12/2021 |
| JP | 2006244389 A | 9/2006 |
| WO | 2020/215437 A1 | 10/2020 |

OTHER PUBLICATIONS

Wang, Rubin et al., "Distributed Distance Join Algorithm for Massive Spatial Data", Computer Science, vol. 49, No. 01, Jan. 15, 2022, pp. 95-99.

Chen Luo et al., "Distributed Spatial Join Processing Based on Recursive Partitioning" Geomatics World, vol. 22, No. 6, Dec. 2015.

Xiao Yu-Quin et al."Direction Relation Query Processing Using R-Trees", Journal of Software, vol. 15, No. 1, 2004, 15(1):103~111.

Danial Aghajarian, "A Heterogeneous High Performance Computing Framework for III-Structured Spatial Join Processing", ScholarWorks @ Georgia State University, Comnputer Science Dissertations, Aug. 7, 2018.

Huajun He et al., "Efficient Suspected Infected Crowds Detection Based on Spatio-Temporal Trajectories", arXiv:2004.06653v1 [cs. DB] Apr. 11, 2020.

Xu Hun et al., "Office Action for CN application 202110113826.9", Sep. 6, 2024, CNIPA, China.

Junji Nakamoto et al., "Office Action for JP application 2023-541038", Jul. 16, 2024, JPO, Japan.

* cited by examiner

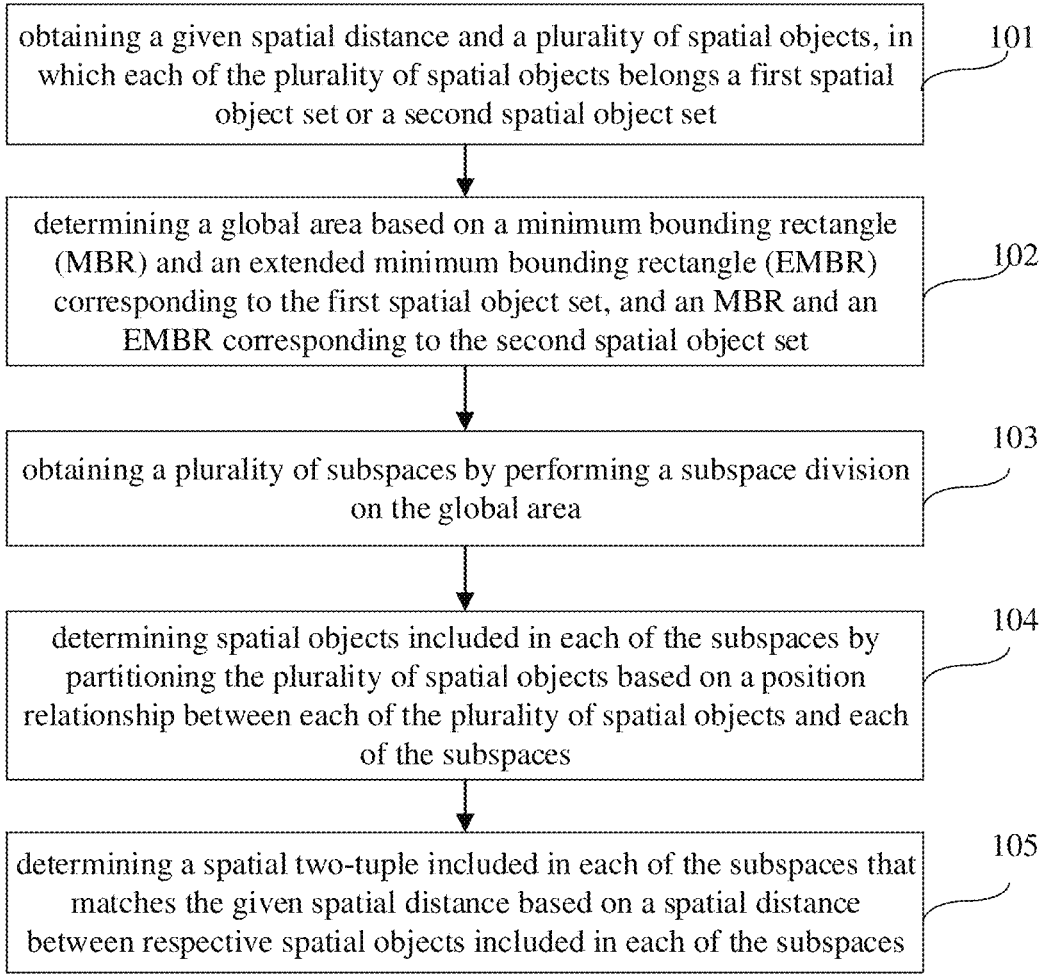

| | |
|---|---|
| obtaining a given spatial distance and a plurality of spatial objects, in which each of the plurality of spatial objects belongs a first spatial object set or a second spatial object set | 101 |
| determining a global area based on a minimum bounding rectangle (MBR) and an extended minimum bounding rectangle (EMBR) corresponding to the first spatial object set, and an MBR and an EMBR corresponding to the second spatial object set | 102 |
| obtaining a plurality of subspaces by performing a subspace division on the global area | 103 |
| determining spatial objects included in each of the subspaces by partitioning the plurality of spatial objects based on a position relationship between each of the plurality of spatial objects and each of the subspaces | 104 |
| determining a spatial two-tuple included in each of the subspaces that matches the given spatial distance based on a spatial distance between respective spatial objects included in each of the subspaces | 105 |

FIG. 1A

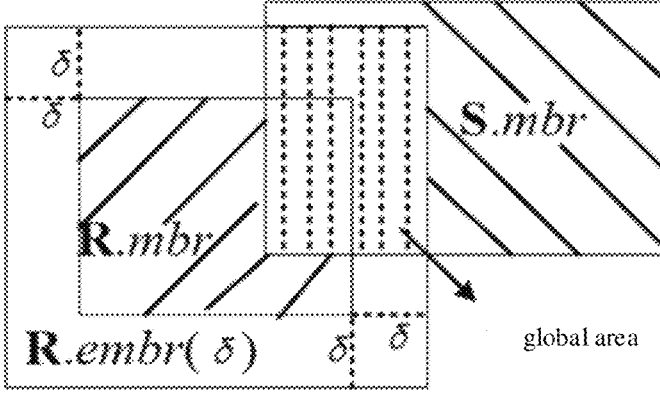

FIG. 1B

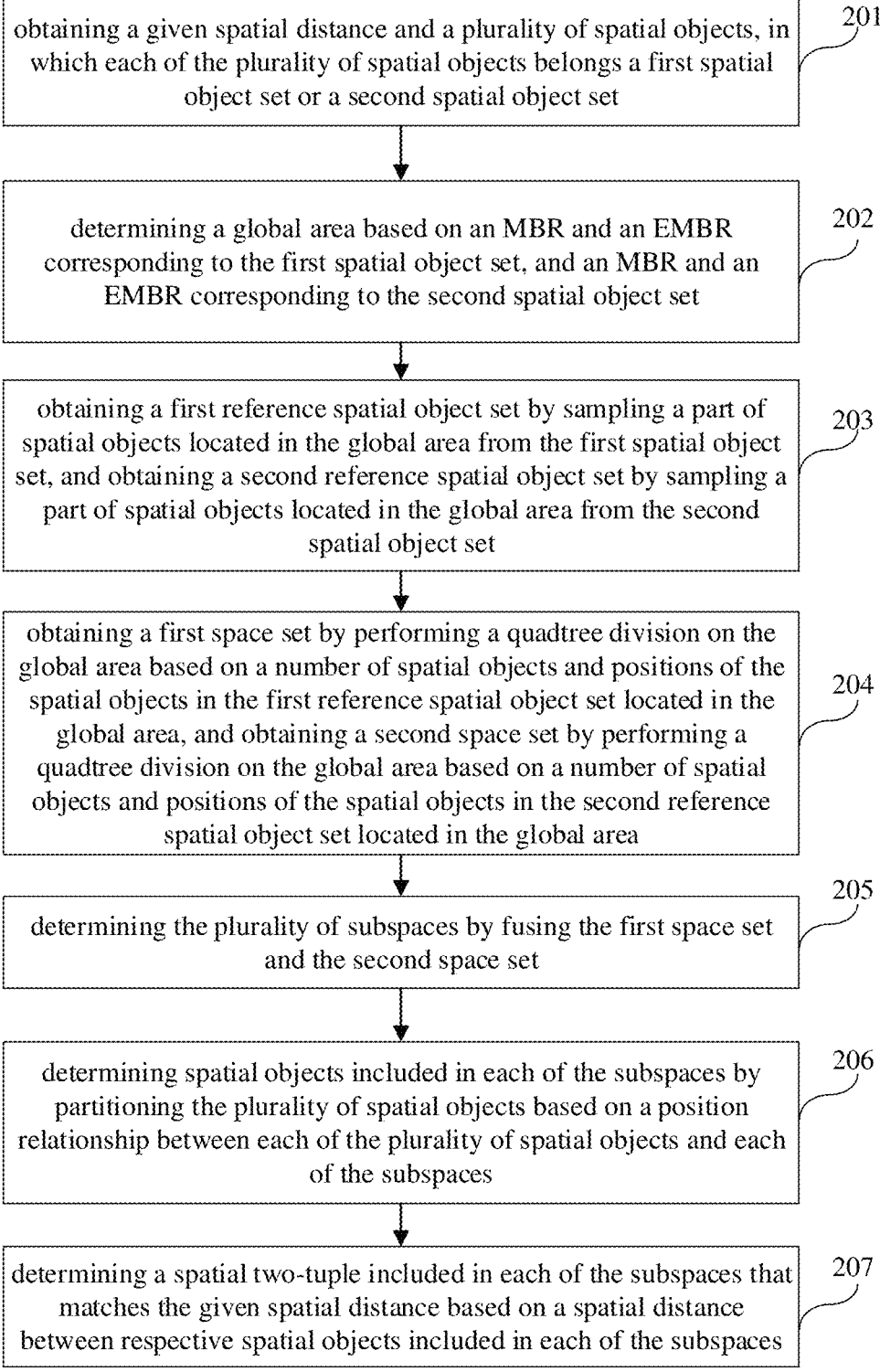

obtaining a given spatial distance and a plurality of spatial objects, in which each of the plurality of spatial objects belongs a first spatial object set or a second spatial object set

201 determining a global area based on an MBR and an EMBR corresponding to the first spatial object set, and an MBR and an EMBR corresponding to the second spatial object set

202 obtaining a first reference spatial object set by sampling a part of spatial objects located in the global area from the first spatial object set, and obtaining a second reference spatial object set by sampling a part of spatial objects located in the global area from the second spatial object set

203 obtaining a first space set by performing a quadtree division on the global area based on a number of spatial objects and positions of the spatial objects in the first reference spatial object set located in the global area, and obtaining a second space set by performing a quadtree division on the global area based on a number of spatial objects and positions of the spatial objects in the second reference spatial object set located in the global area

204 determining the plurality of subspaces by fusing the first space set and the second space set

205 determining spatial objects included in each of the subspaces by partitioning the plurality of spatial objects based on a position relationship between each of the plurality of spatial objects and each of the subspaces

206 determining a spatial two-tuple included in each of the subspaces that matches the given spatial distance based on a spatial distance between respective spatial objects included in each of the subspaces

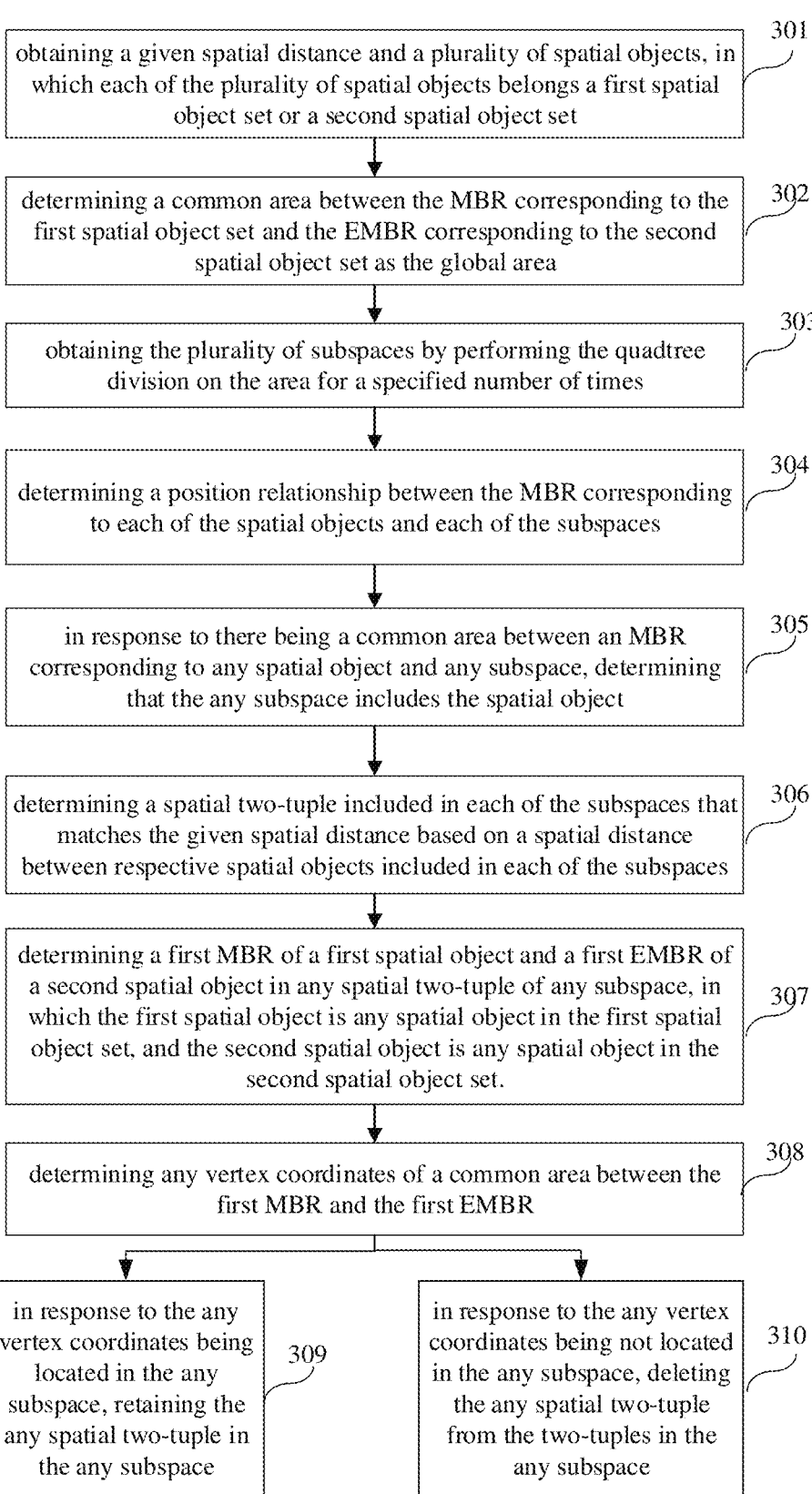

obtaining a given spatial distance and a plurality of spatial objects, in which each of the plurality of spatial objects belongs a first spatial object set or a second spatial object set

301 determining a common area between the MBR corresponding to the first spatial object set and the EMBR corresponding to the second spatial object set as the global area

302 obtaining the plurality of subspaces by performing the quadtree division on the area for a specified number of times

303 determining a position relationship between the MBR corresponding to each of the spatial objects and each of the subspaces

304 in response to there being a common area between an MBR corresponding to any spatial object and any subspace, determining that the any subspace includes the spatial object

305 determining a spatial two-tuple included in each of the subspaces that matches the given spatial distance based on a spatial distance between respective spatial objects included in each of the subspaces

306 determining a first MBR of a first spatial object and a first EMBR of a second spatial object in any spatial two-tuple of any subspace, in which the first spatial object is any spatial object in the first spatial object set, and the second spatial object is any spatial object in the second spatial object set.

307 determining any vertex coordinates of a common area between the first MBR and the first EMBR

308 in response to the any vertex coordinates being located in the any subspace, retaining the any spatial two-tuple in the any subspace

309 in response to the any vertex coordinates being not located in the any subspace, deleting the any spatial two-tuple from the two-tuples in the any subspace

METHOD AND APPARATUS FOR DETERMINING SPATIAL TWO-TUPLE, COMPUTER DEVICE, AND STORAGE MEDIUM

CROSS-REFERENCE TO RELATED APPLICATIONS

This application is the U.S. national phase application of International Application No. PCT/CN2022/073864, filed on Jan. 25, 2022, which is based on and claims priority to Chinese Patent Application No. 202110113826.9, filed on Jan. 27, 2021, the entire contents of which are incorporated herein by reference.

TECHNICAL FIELD

The present disclosure relates to a field of computer technologies, and particularly to a method for determining a spatial two-tuple, a computer device and a storage medium.

BACKGROUND

With the popularity of a global positioning system and a mobile Internet device, massive spatial data is also generated. A distance connection between spatial data is one of the most commonly used spatial analysis operators, and has a wide range of application scenarios, for example, searching for points of interest within a range of 500 meters away from a subway station, company site selection planning, finding a highway and a bridge through which a river passes, and checking a potential flood danger. In a spatial partitioning stage, if a selected global area is too large and invalid data that does not contribute to a final result is not filtered in advance, a waste of a network bandwidth and a computing storage resource may be caused, and an overall performance may be finally reduced. It is crucial how to select a more suitable global area.

SUMMARY

A method for determining a spatial two-tuple is proposed in a first aspect of the present disclosure. The method includes: obtaining a given spatial distance and a plurality of spatial objects, in which each of the plurality of spatial objects belongs to a first spatial object set or a second spatial object set; determining a global area based on a minimum bounding rectangle (MBR) and an extended minimum bounding rectangle (EMBR) corresponding to the first spatial object set, and an MBR and an EMBR corresponding to the second spatial object set; obtaining a plurality of subspaces by performing a subspace division on the global area; determining spatial objects included in the subspace by partitioning the plurality of spatial objects based on a position relationship between each of the plurality of spatial objects and each of the subspaces; and determining a spatial two-tuple comprised in each of the subspaces that matches the given spatial distance based on a spatial distance between respective spatial objects comprised in each of the subspaces.

A computer device is proposed in a second aspect of the present disclosure, which includes a processor, and a memory, stored with a computer program executable by the processor. The processor executes the computer program to implement the method for determining a spatial two-tuple provided in the first aspect of the present disclosure.

A non-transitory computer-readable storage medium stored with a computer program is proposed in a third aspect of the present disclosure. The computer program implements the method for determining a spatial two-tuple provided in the first aspect of the present disclosure.

Additional aspects and advantages of the present disclosure will be set forth in part in the following description, and in part will become obvious from the following description, or may be learned by practice of the disclosure.

BRIEF DESCRIPTION OF THE DRAWINGS

The above and/or additional aspects and advantages of the present disclosure may become apparent and easy to understand from the following description of the embodiments in conjunction with the accompanying drawings.

FIG. 1A is a flowchart illustrating a method for determining a spatial two-tuple according to an embodiment of the present disclosure.

FIG. 1B is a diagram illustrating a global area according to an embodiment of the present disclosure.

FIG. 3A is a flowchart illustrating a method for determining a spatial two-tuple according to another embodiment of the present disclosure;

FIG. 4A is a flowchart illustrating a method for determining a spatial two-tuple according to another embodiment of the present disclosure;

DETAILED DESCRIPTION

Figure 2A:
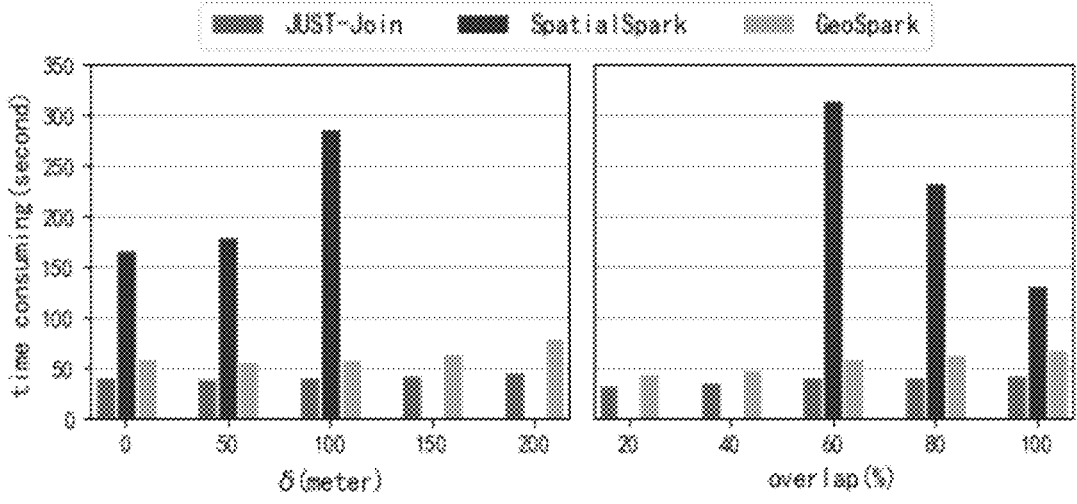
FIG. 2A is a diagram illustrating a computing time consumption when a spatial two-tuple is determined according to an embodiment of the present disclosure.

Embodiments of the present disclosure are described in detail below, and examples of embodiments are illustrated in the accompanying drawings, throughout which the same or similar labels represent the same or similar elements or elements with the same or similar functions. The embodiments described below with reference to the drawings are exemplary, are intended to be configured to explain the present disclosure and are not to be construed as a limitation of the present disclosure.

A method and an apparatus for determining a spatial two-tuple, a computer device and a storage medium in the embodiments of the present disclosure are described below with reference to the attached drawings.

FIG. 1A is a flowchart illustrating a method for determining a spatial two-tuple according to an embodiment of the present disclosure.

The embodiment of the present disclosure is illustrated by the method for determining a spatial two-tuple being executed by an apparatus for determining a spatial two-tuple. The apparatus for determining a spatial two-tuple is applicable to any computer device, so that the computer device is caused to perform the function of determining a spatial two-tuple.

The computer device may be a personal computer (PC), a cloud device, a mobile device, etc. and the mobile device may be a mobile phone, a tablet computer, a personal digital assistant, a wearable or a vehicle-mounted device and other hardware devices with various operating systems, touch screens, and/or display screens.

As illustrated in FIG. 1A, the method for determining a spatial two-tuple may include the following steps at 101 to 105.

At 101, a given spatial distance and a plurality of spatial objects are obtained. Each of the plurality of spatial objects belongs a first spatial object set or a second spatial object set.

The given spatial distance may be denoted as δ, which may be any positive number.

In addition, for the convenience of explanation, the first spatial object set may be denoted as S, the second spatial object set may be denoted as R, a spatial object belonging to the first spatial object set S in the obtained spatial objects may be denoted as s, and a spatial object belonging to the second spatial object set R in the obtained spatial objects may be denoted as r.

It may be understood that, the spatial object may be a point object or a line object or a face object.

It should be noted that, the δ, S, R, s and r are only illustrative and are not intended to be a limitation of the given spatial distance, the first spatial object set, the second spatial object set and the spatial object in the embodiments of the present disclosure.

At 102, a global area is determined based on a minimum bounding rectangle (MBR) and an extended minimum bounding rectangle (EMBR) corresponding to the first spatial object set, and an MBR and an EMBR corresponding to the second spatial object set.

The MBR may also be referred to as a minimum tangent rectangle or a minimum enclosing rectangle or a minimum area rectangle. The MBR means a maximum range of several two-dimensional shapes (for example, a point, a straight line, a polygon) represented by two-dimensional coordinates, that is, a rectangle with a maximum abscissa, a minimum abscissa, a maximum ordinate, and a minimum ordinate in each vertex of a given two-dimensional shape as a boundary. Such a rectangle includes the given two-dimensional shape and its edge is parallel to a coordinate axis.

It may be understood that, the MBR corresponding to the first spatial object set may be a minimum rectangle whose edge is parallel to the coordinate axis and that includes all the spatial objects in the first spatial object set.

In addition, the EMBR may be a rectangle obtained after the corresponding MBR is expanded with a corresponding numerical value.

For example, the EMBR of the second spatial object set R may be an ε expansion of the minimum bounding rectangle R.mbr, $R.embr(\varepsilon) < ex_{min}, ey_{min}, ex_{max}, ey_{max} > = < x_{min} - y_{min} - \varepsilon, x_{max}\varepsilon, y_{max}\varepsilon >$, where $< x_{min}, y_{min}, x_{max}, y_{max} >$ is the MBR of R, and ε may be any given positive number.

In addition, there may be various ways for determining a global area.

For example, an MBR corresponding to the first spatial object set and an EMBR corresponding to the second spatial object set may be determined first, and a common area between the MBR corresponding to the first spatial object set and the EMBR corresponding to the second spatial object set may be determined as the global area.

For example, in a diagram as illustrated in FIG. 1B, the MBR corresponding to the first spatial object set S is S.mbr in a right oblique line area, the MBR corresponding to the second spatial object set R is R.mbr in a left oblique line area, R.embr(δ) is the EMBR corresponding to the second spatial object set R after an δ expansion of the MBR is performed, and a common area (i.e., a dashed area in the diagram) between the S.mbr and the R.embr(δ) is determined as the global area.

It should be noted that the above example is only illustrative and is not intended to be a limitation to scopes, shapes and contents of the first spatial object set and its corresponding MBR, and the second spatial object set and its corresponding EMBR in the embodiments of the present disclosure.

Alternatively, the EMBR corresponding to the first spatial object set and the MBR corresponding to the second spatial object set may be determined first, and a common area between the EMBR corresponding to the first spatial object set and the MBR corresponding to the second spatial object set may be determined as a global area.

Alternatively, the EMBR corresponding to the first spatial object set and the EMBR corresponding to the second spatial object set may be determined first, and a common area between the EMBR corresponding to the first spatial object set and the EMBR corresponding to the second spatial object set may be determined as a global area.

Alternatively, the MBR corresponding to the first spatial object set and the MBR corresponding to the second spatial object set may be determined first, and a common area between the MBR corresponding to the first spatial object set and the MBR corresponding to the second spatial object set may be determined as a global area.

It should be noted that the above examples are illustrative and are not intended to be a limitation to the way for determining a global area in the embodiments of the present disclosure.

In the embodiments of the present disclosure, a relatively small global area may be determined, so that invalid data may be filtered in advance, a consumption of an additional CPU resource and a memory resource and an unnecessary network transmission overhead may be reduced in subsequent data processing, thereby greatly improving the data processing efficiency.

At 103, a plurality of subspaces are obtained by performing a subspace division on the global area.

There may be various ways for performing the subspace division on the global area.

For example, a quadtree division may be performed on the global area as a whole, thereby ensuring that a number of spatial objects in each leaf node is substantially same.

Further, after the quadtree division is performed on the global area as a whole, if there are more spatial objects in two parts of the obtained four parts, the quadtree division may be continued on the two parts, thereby obtaining a plurality of subspaces.

Alternatively, an octree division may also be performed on the global area, and if there are more spatial objects in three parts in an obtained division result, the octree division may be continued on the three parts, thereby obtaining a plurality of subspaces.

It should be noted that the above examples are only illustrative and are not intended to be a limitation to obtaining a plurality of subspaces in the embodiments of the present disclosure.

In the embodiments of the present disclosure, the global area is divided into a plurality of subspaces, so that spatial objects of each subspace may be substantially same to the greatest extent, thereby achieving a load balance, and further improving an overall operation efficiency.

At 104, spatial objects included in each of the subspaces are determined by partitioning the plurality of spatial objects based on a position relationship between each of the plurality of spatial objects and each of the subspaces.

The position relationship may be intersection, complete coincidence, or non-intersection.

In addition, there may be various ways for determining spatial objects included in each subspace.

For example, a position relationship between each spatial object and each subspace may be determined first, and when the plurality of spatial objects are partitioned, spatial objects belonging to the same subspace may be divided into a same subspace.

For example, when a spatial object $r_1$ intersects with a subspace 1, the spatial object $r_1$ may be divided into the subspace 1. When a spatial object $s_1$ intersects with the subspace 1 and a subspace 2, the spatial object $s_1$ may be divided into the subspace 1 and the subspace 2. As such, it may be determined that the subspace 1 includes the spatial object $r_1$ and the spatial object $s_1$, and the subspace 2 includes the spatial object $s_1$.

Alternatively, a position relationship between the MBR corresponding to each spatial object and each subspace may also be determined first, and when the plurality of spatial objects are partitioned, spatial objects belonging to the same subspace may be divided into the same subspace.

For example, when the MBR (i.e., $R_1$.mbr) corresponding to the spatial object $r_1$ intersects with the subspace 2, the spatial object $r_1$ may be divided into the subspace 2. When the MBR (i.e., $S_1$.mbr) corresponding to the spatial object $s_1$ intersects with the subspace 1, the subspace 2 and a subspace 3, the spatial object $s_1$ may be divided into the subspace 1, the subspace 2 and the subspace 3. As such, it may be determined that the subspace 1 includes the spatial object $s_1$, the subspace 2 includes the spatial object $r_1$ and the spatial object $s_1$, and the subspace 3 includes the spatial object $s_1$.

Alternatively, a position relationship between the EMBR corresponding to each spatial object and each subspace may be determined first, and when the plurality of spatial objects are partitioned, spatial objects belonging to the same subspace may be divided into the same subspace.

For example, when the EMBR (i.e., $R_1$.embr) corresponding to the spatial object $r_1$ intersects with the subspace 1, the spatial object $r_1$ may be divided into the subspace 1. When the EMBR (i.e., $S_1$.embr) corresponding to the spatial object $s_1$ intersects with the subspace 1 and the subspace 2, the spatial object $s_1$ may be divided into the subspace 1 and the subspace 2. As such, it may be determined that the subspace 1 includes the spatial object $r_1$ and the spatial object $s_1$, and the subspace 2 includes the spatial object $s_1$.

It should be noted that, the above $r_1$, $s_1$, $R_1$.mbr, $S_1$.mbr, $R_1$.embr and $S_1$.embr are only illustrative and cannot be a limitation to determining a spatial object included in each subspace in the embodiments of the present disclosure.

At 105, a spatial two-tuple included in each of the subspaces that matches the given spatial distance is determined based on a spatial distance between respective spatial objects included in each of the subspaces.

When the spatial distance between the spatial objects is determined, it may be calculated by using a minimum Euclidean distance formula or may be calculated by using a Manhattan distance formula.

If the spatial distance between the first spatial object and the second spatial object in any subspace is less than or equal to the value of δ, it may be determined that the set of spatial objects is a spatial two-tuple that satisfies a match condition.

For example, spatial objects in the subspace 1 include $s_1$, $s_2$, $s_3$, $r_1$, $r_2$, the spatial distance $L_{11}$ between $s_1$ and $r_1$, the spatial distance $L_{12}$ between $s_1$ and $r_2$, the spatial distance $L_{21}$ between $s_2$ and $r_1$, the spatial distance $L_{22}$ between $s_2$ and $r_2$, the spatial distance $L_{31}$ between $s_3$ and $r_1$, the spatial distance $L_{32}$ between $s_3$ and $r_2$ are respectively determined based on the minimum Euclidean distance formula. When $L_{11}$, $L_{22}$, $L_{31}$ are less than the value of 6, it may be determined that the spatial two-tuples less than or equal to the 6 included in the subspace 1 are $(s_1, r_1)$, $(s_2, r_2)$, $(s_3, r_1)$.

It should be noted that, the subspace 1, the spatial objects $s_1$, $s_2$, $s_3$, $r_1$, $r_2$ and the spatial distances $L_{11}$, $L_{12}$, $L_{21}$, $L_{22}$, $L_{31}$, $L_{32}$ are only illustrative, and may not be a limitation to each subspace, each spatial object, the spatial distance and the spatial two-tuple.

An experiment is conducted by taking an open street map (OSM) spatial data set for an example, an effect of the method for determining a spatial two-tuple according to the disclosure is described.

Points data and polygons data used in the experiment are illustrated in Table 1, and they are globally distributed and spatially unevenly distributed.

TABLE 1

| Experiment Data Set | | | |
| --- | --- | --- | --- |
| Data Set | Data Volume (hundred millions) | Original Document Size (GBs) | Total Number of Coordinates (hundred millions) |
| Points | 2 | 5.4 | 2 |
| Polygons | 1.14 | 19 | 7.64 |

In the experiment, there is a distributed cluster consisting of five servers in the experiment environment, and a single server is configured as a CentOS 7.4, a 30-core CPU, a 100 GB memory and a 1 T hard disk. Big data components used herein are Hadoop 2.7.3 and Spark 2.3.3.

In order to verify the advantages of the method for determining the spatial two-tuple according to the present disclosure in terms of computing a global area, a global spatial range is divided into five square areas with a length span of 180° and a width span of 180°: Grid 1, Grid 2, Grid 3, Grid 4 and Grid 5, in which areas of intersection parts between Grid 1 and other four square areas are 20%, 40%, 60%, 80% of the Grid 1 area, respectively, which are referred to as spatial overlaps. The spatial overlap between Grid 1 and the Grid 1 itself is 100%. In the experiment, the data set corresponding to Grid 1 corresponds to R. Taking an overlap between two data sets as a variable, computing time consumption of a spatial distance connection is observed in the experiment when the overlap is 20%, 40%, 60%, 80% and 100%, respectively. In addition, in order to verify the advantages of the method for determining the spatial two-tuple according to the present disclosure in terms of expansibility, taking the spatial distance δ as a variable, computing time consumption of the spatial distance connection is observed in the experiment when δ is 0 m, 50 m, 100 m, 150 m and 200 m, respectively. It should be noted that, since a part of systems do not support the spatial distance connection, and only supports a spatial connection, that is, δ=0, a default value of δ is 0 when the overlap is a variable. When δ is a variable, a default value of the overlap is 60%.

Figure 2B:
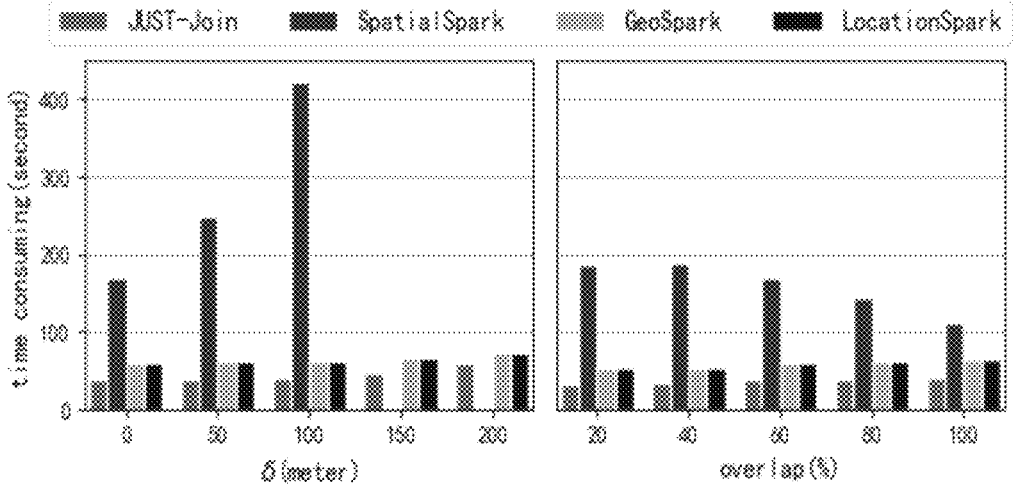
FIG. 2B is a diagram illustrating a computing time consumption when a spatial two-tuple is determined according to an embodiment of the present disclosure.
Figure 2C:
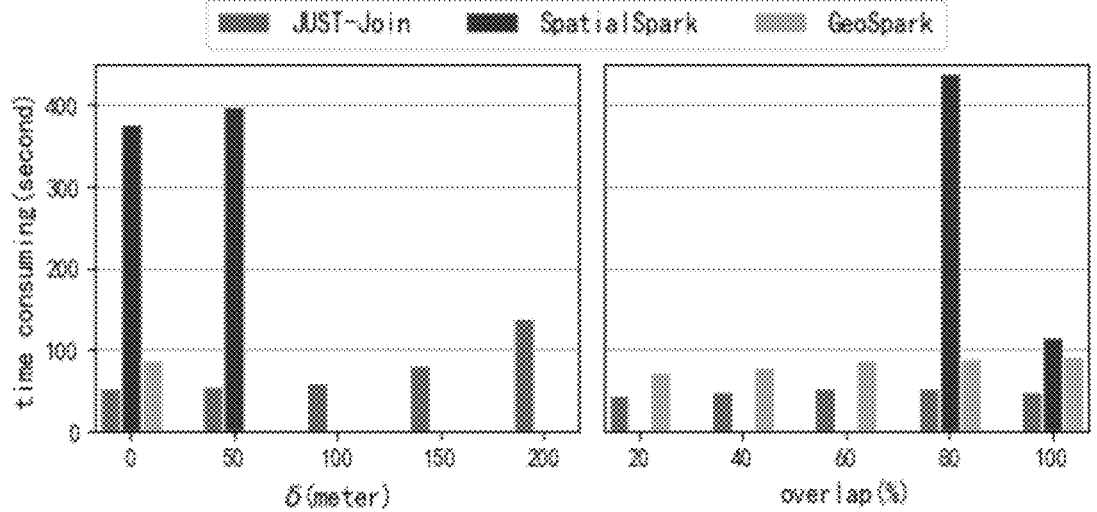
FIG. 2C is a diagram illustrating a computing time consumption when a spatial two-tuple is determined according to an embodiment of the present disclosure.

As illustrated in FIG. 2A, spatial objects in the spatial two-tuple are a point and a point. FIG. 2A is a schematic diagram of a computing time consumption when a spatial distance between a point and a point is determined. As illustrated in FIG. 2B, spatial objects in the spatial two-tuple are a polygon and a point, and FIG. 2B is a schematic diagram of a computing time consumption when a spatial distance between a polygon and a point is determined. As illustrated in FIG. 2C, spatial objects in the spatial two-tuple are a polygon and a point, and FIG. 2C is a schematic diagram of a computing time consumption when a spatial distance between a polygon and a polygon is determined.

Based on the analysis of FIG. 2A, FIG. 2B and FIG. 2C, it can be seen that the method for determining the spatial two-tuple according to the present disclosure is better than the existing most advanced distributed method in terms of efficiency and accuracy.

It should be noted that the above experiment are only illustrative and are not intended to be a limitation to an experiment environment, experiment data and components in the embodiments of the present disclosure.

In the embodiments of the present disclosure, the given spatial distance and the plurality of spatial objects may be obtained first, and the global area may be determined based on the MBR and the EMBR corresponding to the first spatial object set, and the MBR and the EMBR corresponding to the second spatial object set, so that the plurality of subspaces may be obtained by performing the subspace division on the global area, spatial objects included in each subspace are determined by partitioning the plurality of spatial objects based on the position relationship between each spatial object and each subspace, and the spatial two-tuple included in each of the subspaces that matches the given spatial distance may be determined based on the spatial distance between respective spatial objects included in each of the subspaces. Thus, the global area may be determined based on the MBR and the EMBR corresponding to the first spatial object set, and the MBR and the EMBR corresponding to the second spatial object set, and the spatial two-tuple included in each subspace in the global area may be determined, which filters invalid data in advance through a relatively small global area, reduces a resource overhead and improves a data processing efficiency.

In the above embodiment, the global area may be determined based on the MBR and the EMBR corresponding to the first spatial object set, and the MBR and the EMBR corresponding to the second spatial object set, and a spatial two-tuple included in each subspace in the global area may be determined. In some implementations, when the global area is divided into a plurality of subspaces, the space division may be performed on the global area respectively based on the first spatial object set and the second spatial object set to obtain a plurality of subspaces, which will be described in combination with FIG. 3A.

As illustrated in FIG. 3A, the method for determining a spatial two-tuple may include steps at 201 to 207.

At 201, a given spatial distance and a plurality of spatial objects are obtained. Each of the plurality of spatial objects belongs to a first spatial object set or a second spatial object set.

At 202, a global area is determined based on an MBR and an EMBR to the first spatial object set, and an MBR and an EMBR corresponding to the second spatial object set.

At 203, a first reference spatial object set is obtained by sampling a part of spatial objects located in the global area from the first spatial object set, and a second reference spatial object set is obtained by sampling a part of spatial objects located in the global area from the second spatial object set. For massive spatial data, the sampling may be performed before a corresponding data processing is performed in order to improve a processing rate and an efficiency.

It needs to be noted that, when application scenarios are different, a size of a sampling rate may be different. For example, the sampling rate may be 0.01, 0.05, 0.1 or 0.2.

In actual applications, the sampling may be performed at a suitable sampling rate selected based on an actual situation. For example, in the embodiments of the present disclosure, when the sampling is performed at a sampling rate of 0.01, the obtained sampling data may represent a spatial distribution of the whole data set well.

In addition, the first reference spatial object set may be a spatial object set after sampling the spatial objects of the first spatial object set located in the global area based on a sampling rate. Correspondingly, the second reference spatial object set may be a spatial object set after sampling the spatial objects of the second spatial object set located in the global area based on the sampling rate.

At 204, a first space set is obtained by performing a quadtree division on the global area based on a number of spatial objects and positions of the spatial objects in the first reference spatial object set located in the global area, and a second space set is obtained by performing a quadtree division on the global area based on a number of spatial objects and positions of the spatial objects in the second reference spatial object set located in the global area.

There may be a variety of situations when a quadtree division is performed on the global area.

For example, when the number of spatial objects in the first reference spatial object set located in the global area is greater than a threshold, four first-level subspaces are generated by performing the quadtree division on the global area.

The threshold may be a preset value, and may be any positive integer.

For example, the threshold is 200. When the number of spatial objects in the first reference spatial object set located in the global area is 220, which is greater than the threshold 200, four first-level subspaces may be generated by performing the quadtree division on the global area.

It should be noted that the above example is only illustrative and is not intended to be a limitation to the number of spatial objects located in the first reference spatial object located in the global area, the threshold and the first-level subspaces in the embodiments of the present disclosure.

Then, when the number of spatial objects in the first reference spatial object set included in each of the four first-level subspaces is less than or equal to the threshold, the four first-level subspaces are determined as a first space set corresponding to the first reference spatial object set.

For example, the threshold is 100. When the number of spatial objects in the first reference spatial object set located in the global area is 220, greater than the threshold 100, the quadtree division may be performed on the global area, and the numbers of spatial objects in the first reference spatial object sets included in the four first-level subspaces are 20, 50, 70, 80 respectively, less than the threshold 100. In this case, the quadtree division may be stopped, and the four first-level subspaces may be determined as a first space set corresponding to the first reference spatial object set.

It should be noted that the above example is only illustrative and is not intended to be a limitation to the number of spatial objects in the first reference spatial object set included in the first-level subspace, the threshold and the first space set in the embodiments of the present disclosure.

Alternatively, in some implementations, when the number of spatial objects in the first reference spatial object set included in any first-level subspace is greater than the threshold, four second-level subspaces may be generated by performing the quadtree division on the any first-level subspace.

For example, the threshold is 100. When the number of spatial objects in the first reference spatial object set located in the global area is 220, greater than the threshold 100, the quadtree division may be performed on the global area, and the numbers of spatial objects in the first reference spatial object sets included in the generated four first-level subspaces are respectively 150, 20, 10, 40, where 150 is greater than the threshold). In this case, four second-level subspaces may be generated by continuing the quadtree division on the first-level subspace corresponding to the number of the spatial objects being 150.

It should be noted that the above example is only illustrative and is not intended to be a limitation to the number of spatial objects in the first reference spatial object set included in the first-level subspace, the threshold, the first space set and the second-level subspace in the embodiments of the present disclosure.

Then, when the number of spatial objects in the first reference spatial object set included in each of the four second-level subspaces is less than or equal to the threshold, the four second-level subspaces and each first-level subspace including the number of spatial objects in the first reference spatial object set being less than or equal to the threshold, are determined as a first space set corresponding to the first reference spatial object set.

For example, the threshold is 100. When the number of spatial objects in the first reference spatial object set located in the global area is 220, greater than the threshold 100, the quadtree division may be performed on the global area. The generated four first-level subspaces may be denoted as a first-level subspace 1, a first-level subspace 2, a first-level subspace 3 and a first-level subspace 4, and a number of spatial objects in the first reference spatial object sets included in each of the four first-level subspaces is 150, 20, 10, 40, respectively, where 150 is greater than the threshold. Then, four second-level subspaces may be generated by continuing the quadtree division on the first-level subspace 1. The number of spatial objects in the first reference spatial object sets included in each of the four second-level subspaces may be 30, 40, 50, 30, respectively, all of which are less than the threshold, the four second-level subspaces, the first-level subspace 2, the first-level subspace 3 and the first-level subspace 4 may be determined as a first space set corresponding to the first reference spatial object set.

Correspondingly, when the number of spatial objects in the first reference spatial object sets included in any second-level subspace is greater than the threshold, the quadtree division may be continued on the any second-level subspace until the number of spatial objects in the first reference spatial object set included in each subspace is less than or equal to the threshold.

It should be noted that the above are only illustrative and are not intended to be a limitation to the number of spatial objects in the first reference spatial object set included in each level subspace, the threshold, the first space set and each level subspace in the embodiments of the present disclosure.

In addition, when the number of spatial objects in the second reference spatial object set located in the global area is greater than the threshold, the quadtree division may be repeatedly performed on the global area until the second space set corresponding to the second reference spatial object set is determined.

Correspondingly, when the second space set corresponding to the second reference spatial object set is determined, similar operations may be performed based on the way of determining the first space set corresponding to the first reference spatial object set. That is, when the number of spatial objects in the second reference spatial object set located in the any subspace is greater than the threshold, the quadtree division may be repeatedly performed on the any subspace until the number of spatial objects in the second reference spatial object set included in each level subspace is less than or equal to the threshold, thereby determining the second space set corresponding to the second reference spatial object set.

For example, the threshold is 100. When the number of spatial objects in the second reference spatial object set located in the global area is 220, greater than the threshold 100, the quadtree division may be performed on the global area, and the generated four first-level subspaces may be denoted as the first-level subspace 1, the first-level subspace 2, the first-level subspace 3 and the first-level subspace 4. The numbers of the spatial objects in the second reference spatial object sets included in the four first-level subspaces are 150, 20, 10, 40, respectively, where 150 is greater than the threshold. In this case, four second-level subspaces may be generated by continuing the quadtree division on the first-level subspace 1. The generated four second-level subspaces may be denoted as a second-level subspace 1, a second-level subspace 2, a second-level subspace 3 and a second-level subspace 4, the number of spatial objects in the second reference spatial object set included in each second-level subspace may be 20, 130, 60, 10, where the number of the spatial objects in the second reference spatial object set included in the second-level subspace 2 is greater than the threshold. In this case, four third-level subspaces may be generated by continuing the quadtree division on the second-level subspace 2. The numbers of the spatial objects in the second reference spatial object sets included in the four third-level subspaces may be 10, 20, 60, 30, all of which are less than the threshold. In this case, the four third-level subspaces, the second-level subspace 1, the second-level subspace 3, the second-level subspace 4, the first-level subspace 2, the first-level subspace 3 and the first-level subspace 4 may be determined as a second space set corresponding to the second reference spatial object set.

It should be noted that the above example is only illustrative and is not intended to be a limitation to the number of spatial objects in the second reference spatial object set included in each level subspace, the threshold, the second space set and the level subspace in the embodiments of the present disclosure.

At 205, the plurality of subspaces are determined by fusing the first space set and the second space set.

A corresponding fusion may be performed based on levels of subspaces divided by a quadtree.

For example, when the first space set and the second space set are subspaces at the same level, their respective subspaces may be correspondingly fused.

For example, the finally determined first space set is four first-level subspaces, which are the first-level subspace 1, the first-level subspace 2, the first-level subspace 3 and the first-level subspace 4, respectively, and the finally determined second space set is also four first-level subspaces, which are respectively a first-level subspace 5, a first-level subspace 6, a first-level subspace 7 and a first-level subspace 8, respectively. In this case, the first-level subspaces located in corresponding positions may be respectively fused. For example, the first-level subspace 1 and the first-level subspace 5 are respectively located at the upper left of their corresponding space sets, the first-level subspace 2 and the first-level subspace 6 are respectively located at the bottom left of their corresponding space sets, the first-level subspace 3 and the first-level subspace 7 are respectively located at the upper right of their corresponding space sets, and the first-level subspace 4 and the first-level subspace 8 are respectively located at the bottom right of their corresponding space sets. Then, the first-level subspace 1 and the first-level subspace 5 may be fused, the first-level subspace 2 and the first-level subspace 6 may be fused, the first-level subspace 3 and the first-level subspace 7 may be fused, the first-level subspace 4 and the first-level subspace 8 may be fused.

Alternatively, when any N-level subspace in the first space set includes each (N+1)-level subspace in the second space set, the (N+1)-level subspace may be added to the N-level subspace, where N is a positive integer.

For example, each subspace in the first space set may be the first-level subspace 2, the first-level subspace 3, the first-level subspace 4, the second-level subspace 1, the second-level subspace 2, the second-level subspace 3 and the second-level subspace 4, respectively. Each subspace in the second space set may be the first-level subspace 2, the first-level subspace 3, the first-level subspace 4, the second-level subspace 1, the second-level subspace 2, the second-level subspace 3, a third-level subspace 1, a third-level subspace 2, a third-level subspace 3 and a third-level subspace 4, respectively. In this case, when the first space set is correspondingly fused with the second space set, each first-level subspace in the first space set may be fused with that in the second space set, each second level subspace in the second space set may be fused with that in the first space set, and each third-level subspace in the second space set may be added to the second-level subspace 4 in the first space set.

Figure 3B:
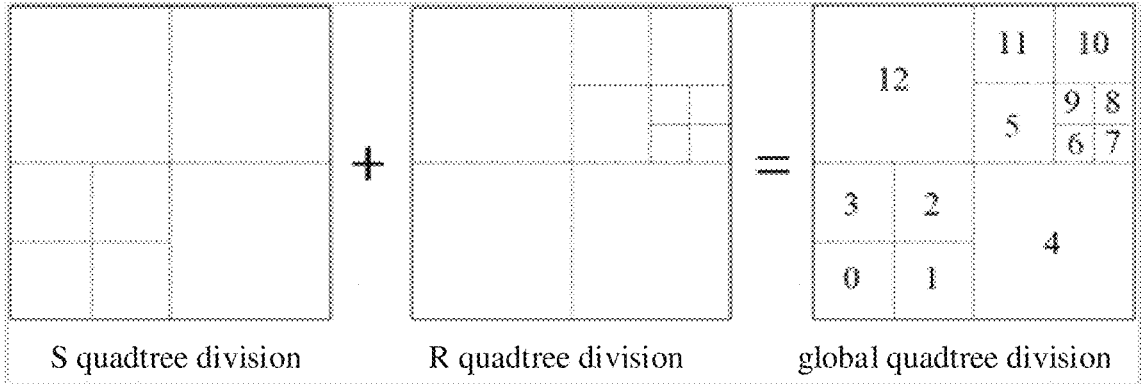
FIG. 3B is a diagram illustrating a subspace according to an embodiment of the present disclosure.

Alternatively, in the subspace division schematic diagram as illustrated in FIG. 3B, it can be seen that the first space set S performs a quadtree division twice to obtain 3 first-level subspaces and 4 second-level subspaces, and the second space set R performs a quadtree division for three times to obtain 2 first-level subspaces, 7 second-level subspaces and 4 third-level subspaces, so that when the subspaces of the first space set S is fused with the subspaces of the second space set R, the first-level subspaces in S may be fused with the first-level subspaces in R, the second-level subspaces in S may be fused with the second-level subspaces in R, and each three-level subspace in R may be added to the second-level subspace. The subspace division result as illustrated in FIG. 3B includes the first-level subspace 12, the first-level subspace 4, the second-level subspace 3, the second-level subspace 2, the second-level subspace 1, the second-level subspace 0, the second-level subspace 11, the second-level subspace 10, the second-level subspace 5, the third-level subspace 9, the third-level subspace 8, the third-level subspace 7 and the third-level subspace 6, respectively.

It should be noted that the above example is only illustrative and is not intended to be a limitation to each level subspace in the first space set and the second space set in the embodiments of the present disclosure.

At 206, spatial objects included in each of the subspaces are determined by partitioning the plurality of spatial objects based on a position relationship between each of the plurality of spatial objects and each of the subspaces.

At 207, a spatial two-tuple included in each of the subspaces that matches the given spatial distance is determined based on a spatial distance between respective spatial objects included in each of the subspaces.

In the embodiments of the present disclosure, the given spatial distance and the plurality of spatial objects may be obtained first, and the global area may be determined based on the MBR and the EMBR corresponding to the first spatial object set, and the MBR and the EMBR corresponding to the second spatial object set. Then, when the subspace division is performed on the global area, the first reference spatial object set may be obtained by sampling a part of spatial objects located in the global area from the first spatial object set, and the second reference spatial object set may be obtained by sampling a part of spatial objects located in the global area from the second spatial object set. Then, the first space set is obtained by performing the quadtree division on the global area based on the number of spatial objects and positions of the spatial objects in the first reference spatial object set located in the global area. The second space set is obtained by performing the quadtree division on the global area based on the number of spatial objects and positions of the spatial objects in the second reference spatial object set located in the global area. The first space set is fused with the second space set to determine a plurality of subspaces. Then, the spatial two-tuple included in each subspace is determined, and the spatial two-tuple that satisfies a condition in each subspace is further determined. Thus, the plurality of subspaces are obtained by performing the space division on the global area respectively based on the first spatial object set and the second spatial object set, so that data volumes of the subspaces are substantially same, which guarantees a load balance, and improves an overall operation efficiency.

In the above embodiments, the quadtree division may be performed on the global area for a plurality of times, and the plurality of spatial objects may be re-partitioned based on a position relationship between each spatial object and each subspace, to determine a spatial two-tuple in each subspace. In some implementations, a same spatial object may span a plurality of subspaces, so that different subspaces may include the same spatial two-tuple, and the finally obtained spatial two-tuple set includes repeated spatial two-tuples. Therefore, when spatial two-tuples included in the subspaces are determined, the spatial two-tuples may be screened, so that the same spatial two-tuple set is only recorded in one subspace, thereby avoiding the repetition. The above process is described in combination with FIG. 4A, and includes steps at 301 to 310.

At 301, a given spatial distance and a plurality of spatial objects are obtained. Each of the plurality of spatial objects belongs a first spatial object set or a second spatial object set.

At 302, a common area between the MBR corresponding to the first spatial object set and the EMBR corresponding to the second spatial object set is determined as the global area.

At 303, the plurality of subspaces are obtained by performing the quadtree division on the area for a specified number of times.

The specified number of times may be any set number of times or a number of times set based on a scope and a size of the global area, or may be a number of times related to a number of spatial objects and positions of the spatial objects located in the global area.

For example, the specified number of times is 2, 4 or 7. For any global area, the quadtree division may be performed for a specified number of times, thereby determining a plurality of subspaces based on a quadtree division result.

Alternatively, when the scope of the determined global area is large, a large specified number of times may be set, such as 10 and 20.

Alternatively, when the spatial object set located in the global area is distributed in a certain subspace of the global area, a large specified number of times may be set for the subspace.

It should be noted that the above example is merely illustrative, and is not intended to be a limitation to a method for determining a specified number of times and its value in the embodiments of the present disclosure.

At 304, a position relationship between the MBR corresponding to each of the spatial objects and each of the subspaces is determined.

At 305, when there is a common area between an MBR corresponding to any spatial object and any subspace, it is determined that the any subspace includes the any spatial object.

There may be various position relationships between the MBR corresponding to each of the spatial objects and each of the subspaces, for example, non-intersection, intersection, complete coincidence, etc.

It may be understood that when the position relationship between the MBR corresponding to the any spatial object and the any subspace is the non-intersection, there is no intersection between any spatial object and any subspace, that is, there is no common area.

Alternatively, when the MBR corresponding to the any spatial object intersects with the position of the any subspace, it may be determined that there is a common area between the MBR corresponding to the any spatial object and the any subspace.

Alternatively, when the MBR corresponding to the any spatial object completely coincides with the position of the any subspace, it may be determined that there is a common area between the MBR corresponding to the any spatial object and the any subspace.

In addition, the subspaces may be numbered, and a numbering way may be arbitrary. For example, the subspaces may be numbered with numerical numbers or letters, as long as the numbering result is unique.

In addition, when there is a common area between the MBR corresponding to the any spatial object and the any subspace, the number of the any subspace may be assigned to the any spatial object having a common area with the any subspace.

For example, four subspaces are currently divided, which are a subspace 1, a subspace 2, a subspace 3 and a subspace 4, respectively, and the spatial objects are $r_1$, $r_2$, $s_1$.

The MBR (i.e., $R_1$.mbr) corresponding to $r_1$ does not intersect with the subspace 1, the $R_1$.mbr intersects with the subspace 2, the $R_1$.mbr intersects with the subspace 3, and the $R_1$.mbr does not intersect with the subspace 4. In this case, it may be determined that the spatial object $r_1$ belongs to the subspace 2 and the subspace 3, so that the numbers of the two subspaces may be assigned to the spatial object $r_1$, and the numbers of the spatial object $r_1$ may be 2, 3.

Then, a relationship between the MBR (i.e., $R_2$.mbr) corresponding to the spatial object $r_2$ and each of the subspaces is sequentially determined. When there is a common area between the subspace 1 and the $R_2$.mbr, and there is a common area between the subspace 3 and the $R_2$.mbr, it may be determined that numbers of the spatial object $r_2$ are 1, 3, respectively.

Then, a relationship between the MBR (i.e., $S_1$.mbr) corresponding to the spatial object $s_1$ and each of the subspaces is sequentially determined. When there is a common area between the subspace 2 and the $S_1$.mbr, and there is a common area between the subspace 3 and the $S_1$.mbr, it may be determined that the numbers of the spatial object $s_1$ are 2, 3, respectively.

Therefore, when the spatial objects are partitioned, spatial objects with the same number may be divided into the same subspace, it may be determined that the spatial object included in the subspace 1 is the spatial object $r_2$, the spatial objects included in the subspace 2 are the spatial objects $r_1$, $s_1$, the spatial objects included in the subspace 3 are the spatial objects $r_1$, $r_2$, $s_1$, and the subspace 4 does not include the spatial object.

It should be noted that the spatial objects $r_1$, $r_2$, $s_1$, the subspace 1, the subspace 2, the subspace 3, the subspace 4, and the position relationship between the MBR corresponding to each spatial object and each subspace are merely illustrative, and are not intended to be a limitation to the spatial object, the subspace, and the position relationship between the MBR corresponding to each spatial object and each subspace in embodiments of the present disclosure.

At 306, a spatial two-tuple included in each of the subspaces that matches the given spatial distance is determined based on a spatial distance between respective spatial objects included in each of the subspaces.

At 307, a first MBR of a first spatial object and a first EMBR of a second spatial object in any spatial two-tuple of any subspace are determined. The first spatial object is any spatial object in the first spatial object set, and the second spatial object is any spatial object in the second spatial object set.

The first MBR may be an MBR corresponding to the first spatial object in the first spatial object set in any subspace. The first EMBR may be an EMBR corresponding to the second spatial object in the any spatial two-tuple in the any subspace.

At 308, any vertex coordinate of a common area between the first MBR and the first EMBR are determined.

At 309, when the any vertex coordinate is located in the any subspace, the any spatial two-tuple in the any subspace is retained.

At 310, when the any vertex coordinate is not located in the any subspace, the any spatial two-tuple is deleted from the two-tuples in the any subspace.

When the spatial two-tuple that matches the given spatial distance included in the subspace is determined, repetition may be caused. For example, the subspace 1 may include $(s_1, r_1)$, and the subspace 2 may also include $(s_1, r_1)$. In this case, in order to avoid the repetition, it may be ensured that the subspaces does not include a repeated spatial two-tuple based on a position of any vertex in the common area between the first MBR of the first spatial object and the first EMBR of the second spatial object in the any spatial two-tuple of the any subspace.

For example, when the subspace 1 includes $(s_1, r_1)$, the subspace 2 also includes $(s_1, r_1)$), and the selected vertex is located in the subspace 1 for the spatial two-tuple $(s_1, r_1)$, the spatial two-tuple $(s_1, r_1)$ in the subspace 1 may be retained, and the spatial two-tuple $(s_1, r_1)$ may be deleted from the subspace 2.

Figure 4B:
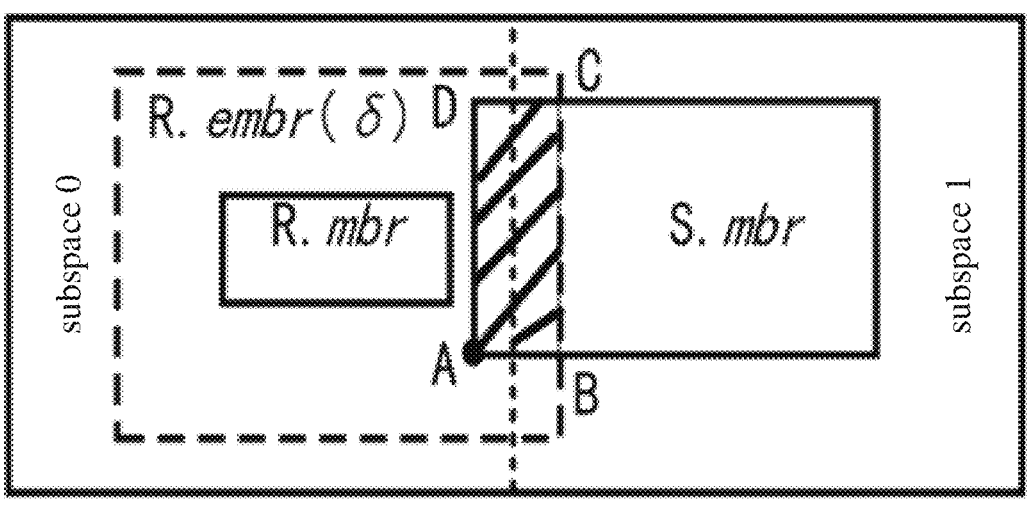
FIG. 4B is a diagram illustrating a spatial two-tuple and a subspace according to an embodiment of the present disclosure.

Alternatively, in the schematic diagram illustrated in FIG. 4B, the spatial two-tuple $(s_1, r_1)$ is located in both the subspace 0 and the subspace 1, the first MBR of the first spatial object $s_1$ in the spatial two-tuple $(s_1, r_1)$ is a solid rectangle S.mbr on the right, the first EMBR of the second spatial object $r_1$ is a dashed rectangle R.embr($\delta$) on the left, and a common area between the S.mbr and the R.embr($\delta$) is an oblique line area at the middle. When the vertex A on the lower left of the oblique line area is selected, it can be seen that the vertex A is located in the subspace 0, then the spatial two-tuple $(s_1, r_1)$ in the subspace 0 may be retained, and the spatial two-tuple $(s_1, r_1)$ in the subspace 1 may be deleted.

It may be understood that, when a vertex is selected, any vertex of the common area between the first MBR and the first EMBR may be selected, for example, a vertex A, a vertex B, a vertex C, or a vertex D.

It should be noted that the above example is merely illustrative, and cannot be a limitation to the any spatial two-tuple and the any subspace in embodiments of the present disclosure.

In the embodiments of the present disclosure, for the spatial two-tuple that satisfies a condition, the first MBR of the first spatial object and the first EMBR of the second spatial object in the any spatial two-tuple of the any subspace may be determined, and it may be determined the any spatial two-tuple in the any subspace is retained or deleted based on whether any vertex coordinate of the common areas between the first MBR and the first EMBR is located in the any subspace, so that the same spatial two-tuple is only recorded in one subspace, and the repetition may be avoided, which reduces an invalid operation, and improves an overall efficiency.

In order to implement the above embodiment, an apparatus for determining a spatial two-tuple is further according to the present disclosure.

Figure 5:
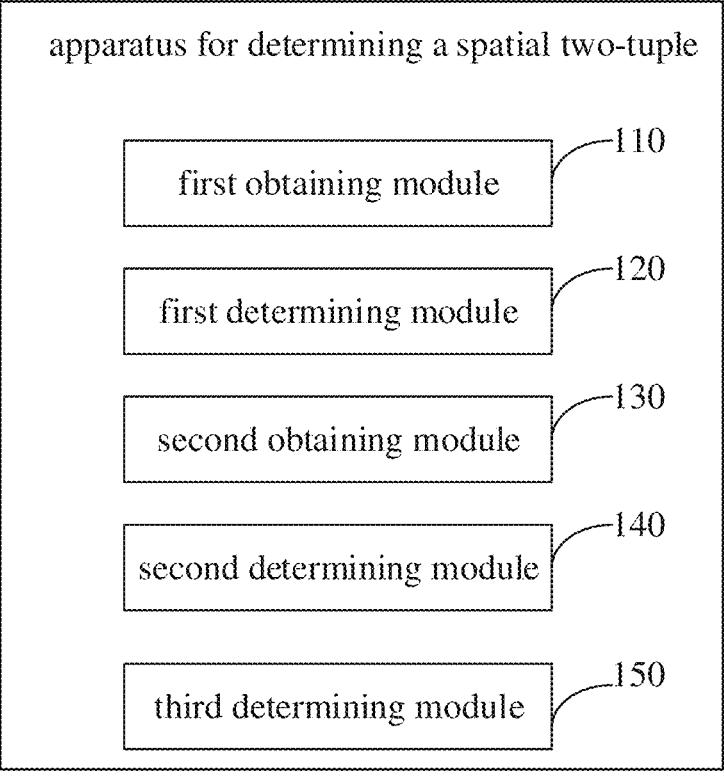
FIG. 5 is a diagram illustrating a structure of an apparatus for determining a spatial two-tuple according to an embodiment of the present disclosure.

FIG. 5 is a diagram illustrating a structure of an apparatus for determining a spatial two-tuple according to an embodiment of the present disclosure.

As illustrated in FIG. 5, the apparatus 100 for determining a spatial two-tuple may include a first obtaining module 110, a first determining module 120, a second obtaining module 130, a second determining module 140 and a third determining module 150.

The first obtaining module 110 is configured to obtain a given spatial distance and a plurality of spatial objects. Each of the plurality of spatial objects belongs to a first spatial object set or a second spatial object set.

The first determining module 120 is configured to determine a global area based on an MBR and an EMBR corresponding to the first spatial object set, and an MBR and an EMBR corresponding to the second spatial object set.

The second obtaining module 130 is configured to obtain a plurality of subspaces by performing a subspace division on the global area.

The second determining module 140 is configured to determine spatial objects included in the subspace by partitioning the plurality of spatial objects based on a position relationship between each of the plurality of spatial objects and each of the subspaces.

The third determining module 150 is configured to determine a spatial two-tuple comprised in each of the subspaces that matches the given spatial distance based on a spatial distance between respective spatial objects comprised in each of the subspaces.

It needs to be noted that, the foregoing explanation of the method for determining a spatial two-tuple is also applicable to an apparatus for determining a spatial two-tuple in the embodiment, which may not be repeated here.

In the apparatus for determining a spatial two-tuple in the embodiments of the present disclosure, the given spatial distance and the plurality of spatial objects may be obtained first, and the global area may be determined based on the MBR and the EMBR corresponding to the first spatial object set, and the MBR and the EMBR corresponding to the second spatial object set, so that the plurality of subspaces may be obtained by performing the subspace division on the global area, and spatial objects included in each subspace may be determined by partitioning the plurality of spatial objects based on the position relationship between each spatial object and each subspace, and the spatial two-tuple included in each of the subspaces that matches the given spatial distance may be determined based on the spatial distance between respective spatial objects included in each of the subspaces. Thus, the global area may be determined based on the MBR and the EMBR corresponding to the first spatial object set, and the MBR and the EMBR corresponding to the second spatial object set, and the spatial two-tuple included in each subspace in the global area may be determined, which filters invalid data in advance through a relatively small global area, reduces a resource overhead and improves a data processing efficiency.

Figure 6:
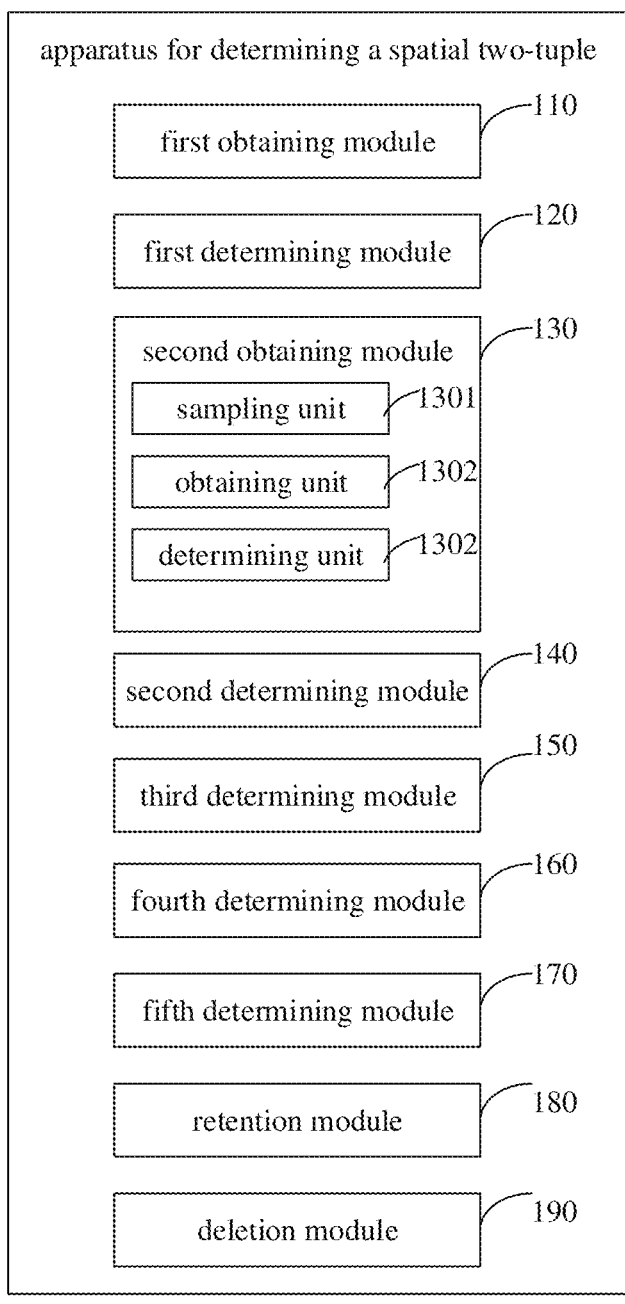
FIG. 6 is a diagram illustrating a structure of an apparatus for determining a spatial two-tuple according to an embodiment of the present disclosure.

Further, in some implementations of embodiments of the present disclosure, as illustrated in FIG. 6, on the basis of embodiments illustrated in FIG. 5, the first determining module 120 is specifically configured to determine a common area between the MBR corresponding to the first spatial object set and the EMBR corresponding to the second spatial object set as the global area.

In some implementations, the second obtaining module 130 includes a sampling unit 1310, an obtaining unit 1320 and a determining unit 1330.

The sampling unit 1310 is configured to obtain a first reference spatial object set by sampling a part of spatial objects located in the global area from the first spatial object set, and obtain a second reference spatial object set by sampling a part of spatial objects located in the global area from the second spatial object set.

The obtaining unit 1320 is configured to obtain a first space set by performing a quadtree division on the global area based on a number of spatial objects and positions of the spatial objects in the first reference spatial object set located in the global area, and obtain a second space set by performing a quadtree division on the global area based on a number of spatial objects and positions of the spatial objects in the second reference spatial object set located in the global area.

The determining unit 1330 is configured to determine the plurality of subspaces by fusing the first space set and the second space set.

In some implementations, the obtaining unit 1320 is specifically configured to: in response to the number of spatial objects in the first reference spatial object set located in the global area being greater than a threshold, generate four first-level subspaces by performing the quadtree division on the global area; in response to a number of spatial objects in the first reference spatial object set included in each of the four first-level subspaces being less than or equal to the threshold, determine the four first-level subspaces as the first space set corresponding to the first reference spatial object set; and in response to the number of spatial objects in the second reference spatial object set located in the global area being greater than a threshold, repeatedly perform the quadtree division on the global area until the second space set corresponding to the second reference spatial object set is determined.

In some implementations, the obtaining unit 1320 is further specifically configured to: in response to a number of spatial objects in the first reference spatial object set included in any first-level subspace being greater than the threshold, generate four second-level subspaces by performing the quadtree division on the any first-level subspace; and in response to the number of spatial objects in the first reference spatial object set included in each of the four second-level subspaces being less than or equal to the threshold, determine, the four second-level subspaces and each first-level subspace including the number of spatial objects in the first reference spatial object set being less than or equal to the threshold, as the first space set corresponding to the first reference spatial object set.

In some implementations, the determining unit 1330 is specifically configured to: in response to any N-level subspace in the first space set including each (N+1)-level subspace in the second space set, add the each (N+1)-level subspace to the N-level subspace, where N is a positive integer.

In some implementations, the second obtaining module 130 specifically configured to: obtain the plurality of subspaces by performing the quadtree division on the global area for a specified number of times.

In some implementations, the second determining module 140 is specifically configured to: determine a position relationship between the MBR corresponding to each of the spatial objects and each of the subspaces; and in response to there being a common area between a MBR corresponding to any spatial object and any subspace, determine the any subspace includes the any spatial object.

Furthermore, in some implementations of the embodiments of the present disclosure, as illustrated in FIG. 6, on the basis of the embodiment as illustrated in FIG. 5, the apparatus 100 may further include: a fourth determining module 160, a fifth determining module 170, a retention module 180 and a deletion module 190.

The fourth determining module 160 is configured to determine a first MBR of a first spatial object and a first EMBR of a second spatial object in any spatial two-tuple of any subspace. The first spatial object is any spatial object in the first spatial object set, and the second spatial object is any spatial object in the second spatial object set.

The fifth determining module 170 is configured to determine any vertex coordinate of a common area between the first MBR and the first EMBR.

The retention module 180 is configured to, in response to the any vertex coordinate being located in the any subspace, retain the any spatial two-tuple in the any subspace.

The deletion module 190 is configured to, in response to the any vertex coordinate being not located in the any subspace, delete the any spatial two-tuple from spatial two-tuples in the any subspace.

It needs to be noted that, the foregoing explanation of the method for determining a spatial two-tuple is also applicable to an apparatus for determining a spatial two-tuple in the embodiment, which may not be repeated here.

In the apparatus for determining a spatial two-tuple in embodiments of the present disclosure, the given spatial distance and the plurality of spatial objects may be obtained, and the global area may be determined based on the MBR and the EMBR corresponding to the first spatial object set, and the MBR and the EMBR corresponding to the second spatial object set. Then, when the subspace division is performed on the global area, the first reference spatial object set may be obtained by sampling a part of spatial objects located in the global area from the first spatial object set, and the second reference spatial object set may be obtained by sampling a part of spatial objects located in the global area from the second spatial object set. Then, the first space set is obtained by performing a quadtree division on the global area based on the number of spatial objects and positions of the spatial objects in the first reference spatial object set located in the global area, and the second space set is obtained by performing a quadtree division on the global area based on the number of spatial objects and positions of the spatial objects in the second reference spatial object set located in the global area. The first space set is fused with the second space set to determine a plurality of subspaces. Then, the spatial two-tuple included in each subspace is determined, and the spatial two-tuple that satisfies a condition in each subspace is further determined. Thus, the plurality of subspaces are obtained by performing a space division on the global area based on the first spatial object set and the second spatial object set, so that data volumes of the subspaces are substantially same, which guarantees a load balance, and improves an overall operation efficiency.

In order to implement the above embodiments, a computer device is provided, which includes a processor, and a memory, stored with a computer program executable by the processor. When the processor executes the computer program, the method for determining a spatial two-tuple is implemented according to the foregoing embodiments of the present disclosure.

In order to implement the above embodiments, a non-transitory computer-readable storage medium stored with a computer program is provided. When the computer program is executed by the processor, the method for determining a spatial two-tuple is implemented according to the foregoing embodiments of the present disclosure.

In order to achieve the above embodiment, a computer program product is provided. When instructions in the computer program are executed by the processor, the method for determining a spatial two-tuple is implemented according to the foregoing embodiments of the present disclosure.

Figure 7:
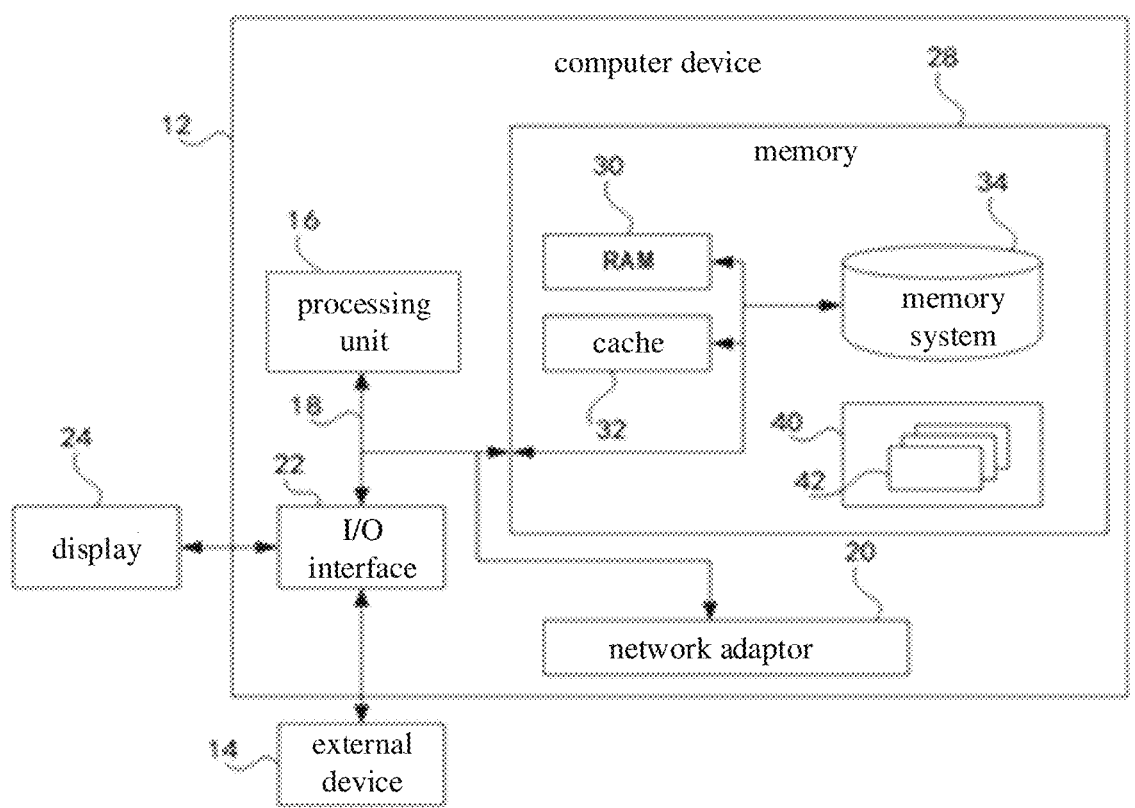
FIG. 7 is a block diagram illustrating an exemplary computer device configured to implement the embodiment of the present disclosure.

FIG. 7 is a block diagram illustrating an exemplary computer device configured to implement the embodiments of the present disclosure. The computer device 12 illustrated in FIG. 7 is only an example and should not bring any limitation on the function or application range of the embodiments.

As illustrated in FIG. 7, the computer device 12 is represented in the form of a general purpose computing device. Components of the computer device 12 may include but not limited to: one or more processors or processing units 16, a system memory 28, a bus 18 connected to different system components (including the system memory 28 and the processing unit 16).

The bus 18 represents one or more of several types of bus structures, including a memory bus or a memory controller, a peripheral bus, a graphics acceleration port, a processor, or a local bus with any of the types of bus structures. For example, the architectures include, but are not limited to, an industry standard architecture (ISA) bus, a micro channel architecture (MAC) bus, an enhanced ISA bus, a video electronics standards association (VESA) local bus and a peripheral component interconnection (PCI) bus.

The computer device 12 includes a variety of computer system readable media. The media may be any available media that may be accessed by the computer device 12, including volatile and non-volatile media, and removable and non-removable media.

The memory 28 may include a computer system readable medium in the form of a volatile memory, for example, a random access memory (RAM) 30 and/or a cache memory 32. The computer device 12 may further include other volatile and non-volatile media, and removable and non-removable media. As an example only, a storage system 34 may be configured to read and write a non-removable and non-volatile magnetic medium (not shown in FIG. 7, commonly referred to as a "hard disk drive"). Although not shown in FIG. 7, a disk drive for reading and writing a removable non-volatile magnetic disk (for example, a "floppy disk"), and an optical disk drive for reading and writing the removable non-volatile optical disk (such as a compact disc read only memory (CD-ROM)) and a digital video disc read only memory (DVD-ROM)) or other optical medium) may be provided. In these cases, each driver may be connected to the bus 18 through one or more data media interfaces. The memory 28 may include at least one program product having a set of program modules (for example, at least one module) configured to perform functions of the embodiments of the present disclosure.

A program/utility 40 having a set of (at least one) program modules 42 may be stored in for example, the memory 28. The program modules 42 include but not limited to, an operating system, one or more application programs, other program modules and program data, and each of or a combination of these examples may include implementations of a network environment. The program modules 42 generally perform functions and/or methods described in the embodiments of the disclosure.

The computer device 12 may also communicate with one or more external devices 14 (for example, a keyboard, a pointing device, a display 24), and may communicate with one or more devices that enable a user to interact with the computer device 12, and/or any device (for example, a network card, a modem, etc.) that enables the computer device 12 to communicate with one or more other computing devices. The communication may be performed by an input/output (I/O) interface 22. The computer device 12 may further communicate with one or more networks (such as a local area network (LAN), a wide area network (WAN), and/or a public network, such as Internet) through a network adapter 20. As shown, the network adapter 20 communicates with other modules of the computer device 12 via the bus 18. It should be understood that although not shown in the figures, other hardwares and/or software modules may be used in combination with the computer device 12, and include but not limited to: a microcode, a device driver, a redundant processing unit, an external disk drive array, a redundant arrays of independent disks (RAID) system, a tape drive and a data backup storage system.

The processing unit 16 executes various function applications and data processings by running a program stored in the system memory 28, for example, the method mentioned in the foregoing embodiments.

In the technical solution in the embodiments of the present disclosure, the given spatial distance and the plurality of spatial objects may be obtained first, and the global area may be determined based on the MBR and the EMBR corresponding to the first spatial object set, and the MBR and the EMBR corresponding to the second spatial object set, so that the plurality of subspaces may be obtained by performing the subspace division on the global area, and spatial objects included in the subspace may be determined by partitioning the plurality of spatial objects based on the position relationship between each spatial object and each subspace, and the spatial two-tuple included in each subspace that matches the given spatial distance may be determined based on the spatial distance between respective spatial objects included in each subspace. Thus, the global area may be determined based on the MBR and the EMBR corresponding to the first spatial object set, and the MBR and the EMBR corresponding to the second spatial object set, and the spatial two-tuple included in each subspace in the global area may be determined, which filters invalid data in advance through a relatively small global area, reduces a resource overhead and improves a data processing efficiency.

In descriptions of the specification, descriptions with reference to the terms "an embodiment", "some embodiments", "an example", "a specific example" or "some examples" etc. mean specific features, structures, materials or characteristics described in conjunction with the embodiments or examples are included in at least one embodiment or example of the present disclosure. In this specification, the schematic representations of the above terms do not have to be the same embodiment or example. Moreover, specific features, structures, materials or characteristics described may be combined in any one or more embodiments or examples in a suitable manner. In addition, those skilled in the art may combine different embodiments or examples and characteristics of different embodiments or examples described in this specification without contradicting each other.

In addition, the terms "first" and "second" used in the present disclosure are only for description purpose, and may not be understood as an indication or implication to the relative importance, or implicit indication to a number of technical features. Therefore, the features limited with the terms "first" and "second" may explicitly or implicitly include at least one of the features. In the description of the present disclosure, "a plurality of" means at least two, for example two, three, etc., unless otherwise specified.

Any process or method descriptions described in the flowchart or in other ways herein may be understood as a module, a segment or a part of codes including one or more executable instructions configured to implement the steps of customized logical functions or processes. The scope of the embodiments of the present disclosure include additional implementations, where the functions are implemented in an order not shown or discussed, including a substantially simultaneous manner according to the involved functions or a reverse order, which should be understood by those skilled in the art to which the embodiments of the present disclosure belong.

The logic and/or steps represented in the flowchart or described in other ways herein, for example, may be considered as an ordered list of executable instructions configured to implement logic functions, which may be specifically implemented in any computer readable medium, for use by an instruction execution system, an apparatus or a device (such as a computer-based system, a system including a processor, or other systems that may obtain and execute instructions from an instruction execution system, an apparatus or a device), or in combination with the instruction execution system, apparatus or device. The "computer readable medium" in this specification may be any apparatus that may contain, store, communicate, propagate or transmit a program for use by the instruction execution system, apparatus or device or in combination with the instruction execution system, apparatus or device. A more specific example of a computer readable medium (a non-exhaustive list) includes the followings: an electronic connector (an electronic device) with one or more cables, a portable computer disk box (a magnetic device), a random access memory (RAM), a read-only memory (ROM), an erasable programmable read-only memory (an EPROM or a flash memory), an optical fiber device, and a portable optical disk read-only memory (CDROM). In addition, the computer readable medium may even be a paper or other suitable medium on which a program may be printed, since the paper or other medium may be optically scanned, then edited, interpreted or processed in other suitable ways if necessary to obtain the program electronically and store the program in a computer memory.

It should be understood that all parts of the present disclosure may be implemented with a hardware, a software, a firmware and their combination. In the above implementation, multiple steps or methods may be stored in a memory and implemented in a software or a firmware executed by a suitable instruction execution system. For example, if implemented in a hardware, they may be implemented by any of the following techniques or their combination known in the art just like in another implementation: a discrete logic circuit with logic gate circuits configured to achieve logic functions for data signals, a special integrated circuit with appropriate combined logic gate circuits, a programmable gate array (PGA), a field programmable gate array (FPGA), etc.

Those skilled in the art may understand that all or part of steps in the above embodiments may be implemented by a program to instruct relevant hardwares, in which the program may be stored in the computer readable storage medium. When the problem is executed, one of or a combination of steps in the embodiments of the method is implemented.

In addition, functional units in the embodiments of the present disclosure may be integrated in a processing module, or may be physically existed separately, or two or more units may be integrated in a module. The above integrated module may be implemented in the form of a hardware or in the form of a software functional module. The integrated module may be stored in a computer readable storage medium when it is implemented in the form of the software functional module and sold and used as an independent product.

The foregoing storage medium may be a ROM, a magnetic disk or a compact disc, etc. It should be understood that, although the embodiments of the present disclosure are shown and described above, the above embodiments are exemplary and cannot be construed as a limitation to the present disclosure. Those skilled in the art may change, modify, substitute and vary the above embodiments within the scope of the present disclosure.

What is claimed is:

1. A method for determining a spatial two-tuple, performed by a computer device, the method comprising:
 obtaining a given spatial distance and a plurality of spatial objects, wherein each of the plurality of spatial objects belongs to a first spatial object set or a second spatial object set;
 determining a global area based on a first minimum bounding rectangle (MBR) and a first extended minimum bounding rectangle (EMBR) corresponding to the first spatial object set, and a second MBR and a second EMBR corresponding to the second spatial object set;
 obtaining a plurality of subspaces by performing a subspace division on the global area;

determining spatial objects included in each of the plurality of subspaces by partitioning the plurality of spatial objects based on a position relationship between each of the plurality of spatial objects and each of the plurality of subspaces; and
 determining a spatial two-tuple included in each of the plurality of subspaces that matches the given spatial distance based on a spatial distance between respective spatial objects included in each of the plurality of subspaces,
 wherein the obtaining of the plurality of subspaces by performing the subspace division on the global area comprises:
 obtaining a first reference spatial object set by sampling a part of spatial objects located in the global area from the first spatial object set, and obtaining a second reference spatial object set by sampling a part of spatial objects located in the global area from the second spatial object set;
 obtaining a first space set by performing a quadtree division on the global area based on a number of spatial objects and positions of the spatial objects in the first reference spatial object set located in the global area, and obtaining a second space set by performing the quadtree division on the global area based on a number of spatial objects and positions of the spatial objects in the second reference spatial object set located in the global area; and
 determining the plurality of subspaces by fusing the first space set and the second space set.

2. The method according to claim 1,
 wherein the determining of the global area comprises determining a common area between the first MBR corresponding to the first spatial object set and the second EMBR corresponding to the second spatial object set as the global area.

3. The method of claim 1,
 wherein the obtaining of the first space set by performing the quadtree division on the global area, and the obtaining of the second space set by performing the quadtree division on the global area comprises:
 in response to the number of spatial objects in the first reference spatial object set located in the global area being greater than a threshold, generating four first-level subspaces by performing the quadtree division on the global area;
 in response to a number of spatial objects in the first reference spatial object set included in each of the four first-level subspaces being less than or equal to the threshold, determining the four first-level subspaces as the first space set corresponding to the first reference spatial object set; and
 in response to the number of spatial objects in the second reference spatial object set located in the global area being greater than the threshold, repeatedly performing the quadtree division on the global area until the second space set corresponding to the second reference spatial object set is determined.

4. The method according to claim 3, further comprising:
 in response to a number of spatial objects in the first reference spatial object set included in any of the four first-level subspaces being greater than the threshold, generating four second-level subspaces by performing the quadtree division on the any of the four first-level subspaces; and
 in response to the number of spatial objects in the first reference spatial object set included in each of the four second-level subspaces being less than or equal to the threshold, determining the four second-level subspaces and each of the four first-level subspaces comprising the number of spatial objects in the first reference spatial object set being less than or equal to the threshold, as the first space set corresponding to the first reference spatial object set.

5. The method according to claim 4,
wherein the determining of the plurality of subspaces by fusing the first space set and the second space set comprises, in response to an N-level subspace in the first space set including an (N+1)-level subspace in the second space set, adding the (N+1)-level subspace to the N-level subspace, where N is a positive integer.

6. The method according to claim 1,
wherein the obtaining of the plurality of subspaces by performing the subspace division on the global area comprises obtaining the plurality of subspaces by performing the quadtree division on the global area for a specified number of times.

7. The method according to claim 1,
wherein the determining of the spatial objects included in each of the plurality of subspaces by partitioning the plurality of spatial objects comprises:
determining a position relationship between the first or second MBR corresponding to each of the plurality of spatial objects and each of the plurality of subspaces; and
when a common area exists between the first or second MBR corresponding to any of the plurality of spatial objects and any of the plurality of subspaces, determining that the any of the plurality of subspaces includes the any of the plurality of spatial objects.

8. The method according to claim 1, further comprising:
determining a third MBR of a first spatial object and a third EMBR of a second spatial object in any spatial two-tuple of any of the plurality of subspaces, wherein the first spatial object is any spatial object in the first spatial object set, and the second spatial object is any spatial object in the second spatial object set;
determining any vertex coordinate of a common area between the third MBR and the third EMBR; and
in response to the any vertex coordinate being located in the any of the plurality of subspaces, retaining the any spatial two-tuple in the any of the plurality of subspaces.

9. The method according to claim 8, further comprising,
in response to the any vertex coordinate being not located in the any of the plurality of subspaces, deleting the any spatial two-tuple from spatial two-tuples in the any of the plurality of subspaces.

10. A computer device, comprising:
a processor, and
a memory stored with a computer program executable by the processor,
wherein the processor is configured to:
obtain a given spatial distance and a plurality of spatial objects, wherein each of the plurality of spatial objects belongs to a first spatial object set or a second spatial object set;
determine a global area based on a first minimum bounding rectangle (MBR) and a first extended minimum bounding rectangle (EMBR) corresponding to the first spatial object set, and a second MBR and a second EMBR corresponding to the second spatial object set;
obtain a plurality of subspaces by performing a subspace division on the global area;

determine spatial objects included in each of the plurality of subspaces by partitioning the plurality of spatial objects based on a position relationship between each of the plurality of spatial objects and each of the plurality of subspaces; and
determine a spatial two-tuple included in each of the plurality of subspaces that matches the given spatial distance based on a spatial distance between respective spatial objects included in each of the plurality of subspaces,
wherein, in obtaining the plurality of subspaces by performing the subspace division on the global area, the processor is configured to:
obtain a first reference spatial object set by sampling a part of spatial objects located in the global area from the first spatial object set, and obtain a second reference spatial object set by sampling a part of spatial objects located in the global area from the second spatial object set;
obtain a first space set by performing a quadtree division on the global area based on a number of spatial objects and positions of the spatial objects in the first reference spatial object set located in the global area, and obtain a second space set by performing the quadtree division on the global area based on a number of spatial objects and positions of the spatial objects in the second reference spatial object set located in the global area; and
determine the plurality of subspaces by fusing the first space set and the second space set.

11. The computer device of claim 10,
wherein in determining the global area, the processor is configured to:
determine a common area between the first MBR corresponding to the first spatial object set and the second EMBR corresponding to the second spatial object set as the global area.

12. The computer device of claim 10,
wherein, in obtaining the first space set and the second space set, the processor is further configured to:
in response to the number of spatial objects in the first reference spatial object set located in the global area being greater than a threshold, generate four first-level subspaces by performing the quadtree division on the global area;
in response to a number of spatial objects in the first reference spatial object set included in each of the four first-level subspaces being less than or equal to the threshold, determine the four first-level subspaces as the first space set corresponding to the first reference spatial object set; and
in response to the number of spatial objects in the second reference spatial object set located in the global area being greater than the threshold, repeatedly perform the quadtree division on the global area until the second space set corresponding to the second reference spatial object set is determined.

13. The computer device of claim 12,
wherein the processor is further configured to:
in response to a number of spatial objects in the first reference spatial object set included in any of the four first-level subspaces being greater than the threshold, generate four second-level subspaces by performing the quadtree division on the any of the four first-level subspaces; and
in response to the number of spatial objects in the first reference spatial object set included in each of the four second-level subspaces being less than or equal to the threshold, determine the four second-level subspaces and each of the four first-level subspaces comprising the number of spatial objects in the first reference spatial object set being less than or equal to the threshold, as the first space set corresponding to the first reference spatial object set.

14. The computer device of claim 13, wherein in determining the plurality of subspaces by fusing the first space set and the second space set, the processor is configured to:

in response to an N-level subspace in the first space set including an (N+1)-level subspace in the second space set, add the (N+1)-level subspace to the N-level subspace, where N is a positive integer.

15. The computer device of claim 10, wherein, in obtaining the plurality of subspaces by performing the subspace division on the global area, the processor is configured to:

obtain the plurality of subspaces by performing the quadtree division on the global area for a specified number of times.

16. The computer device of claim 10, wherein, in determining the spatial objects included in each of the plurality of subspaces, the processor is configured to:

determine a position relationship between the first or second MBR corresponding to each of the plurality of spatial objects and each of the plurality of subspaces; and when a common area exists between the first or second MBR corresponding to any of the plurality of spatial objects and any of the plurality of subspaces, determine that the any of the plurality of subspaces includes the any of the plurality of spatial objects.

17. The computer device of claim 10, wherein the processor is further configured to:

determine a third MBR of a first spatial object and a third EMBR of a second spatial object in any spatial two-tuple of any of the plurality of subspaces, wherein the first spatial object is any spatial object in the first spatial object set, and the second spatial object is any spatial object in the second spatial object set;

determine any vertex coordinate of a common area between the third MBR and the third EMBR; and in response to the any vertex coordinate being located in the any of the plurality of subspaces, retain the any spatial two-tuple in the any of the plurality of subspaces, and in response to the any vertex coordinate being not located in the any of the plurality of subspaces, delete the any spatial two-tuple from spatial two-tuples in the any of the plurality of subspaces.

18. A non-transitory computer-readable storage medium having a computer program stored thereon, wherein when the computer program is executed by a processor of a computer, a method for determining a spatial two-tuple is implemented, the method comprising:

obtaining a given spatial distance and a plurality of spatial objects, wherein each of the plurality of spatial objects belongs to a first spatial object set or a second spatial object set;

determining a global area based on a first minimum bounding rectangle (MBR) and a first extended minimum bounding rectangle (EMBR) corresponding to the first spatial object set, and a second MBR and a second EMBR corresponding to the second spatial object set;

obtaining a plurality of subspaces by performing a subspace division on the global area;

determining spatial objects included in each of the plurality of subspaces by partitioning the plurality of spatial objects based on a position relationship between each of the plurality of spatial objects and each of the plurality of subspaces; and determining a spatial two-tuple included in each of the plurality of subspaces that matches the given spatial distance based on a spatial distance between respective spatial objects included in each of the plurality of subspaces, wherein the obtaining of the plurality of subspaces by performing the subspace division on the global area comprises:

obtaining a first reference spatial object set by sampling a part of spatial objects located in the global area from the first spatial object set, and obtaining a second reference spatial object set by sampling a part of spatial objects located in the global area from the second spatial object set;

obtaining a first space set by performing a quadtree division on the global area based on a number of spatial objects and positions of the spatial objects in the first reference spatial object set located in the global area, and obtaining a second space set by performing the quadtree division on the global area based on a number of spatial objects and positions of the spatial objects in the second reference spatial object set located in the global area; and determining the plurality of subspaces by fusing the first space set and the second space set.

* * * * *